United States Patent
Loce et al.

(10) Patent No.: US 9,977,970 B2
(45) Date of Patent: May 22, 2018

(54) METHOD AND SYSTEM FOR DETECTING THE OCCURRENCE OF AN INTERACTION EVENT VIA TRAJECTORY-BASED ANALYSIS

(71) Applicant: Conduent Business Services, LLC, Dallas, TX (US)

(72) Inventors: Robert P. Loce, Webster, NY (US); Wencheng Wu, Webster, NY (US); Edgar A. Bernal, Webster, NY (US); Michael C. Mongeon, Walworth, NY (US); Daniel S. Hann, Williamson, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days. days.

(21) Appl. No.: 15/196,753

(22) Filed: Jun. 29, 2016

(65) Prior Publication Data
US 2018/0005042 A1 Jan. 4, 2018

(51) Int. Cl.
*G06K 9/00* (2006.01)
*G08B 13/196* (2006.01)
*G06T 7/20* (2017.01)

(52) U.S. Cl.
CPC ........ *G06K 9/00771* (2013.01); *G06T 7/2033* (2013.01); *G08B 13/19608* (2013.01); *G08B 13/19613* (2013.01); *G06T 2207/10016* (2013.01); *G06T 2207/20076* (2013.01); *G06T 2207/30232* (2013.01); *G06T 2207/30241* (2013.01)

(58) Field of Classification Search
CPC ............. G06K 9/00771; G06K 9/6215; G08B 13/19613
USPC ........................................................ 382/103
See application file for complete search history.

(56) References Cited

FOREIGN PATENT DOCUMENTS

WO    WO 2004045215 A1 * 5/2004 ......... G06K 9/00335

OTHER PUBLICATIONS

Oliver, Nuria M., Barbara Rosario, and Alex P. Pentland. "A Bayesian computer vision system for modeling human interactions." IEEE transactions on pattern analysis and machine intelligence 22.8 (2000): 831-843.*

(Continued)

*Primary Examiner* — Amandeep Saini
(74) *Attorney, Agent, or Firm* — Fay Sharpe LLP

(57) ABSTRACT

Disclosed is a method and system for detecting an interaction event between two or more objects in a surveillance area, via the application of heuristics to trajectory representations of the static or dynamic movements associated with the objects. According to an exemplary embodiment, trajectory interaction features (TIFs) are extracted from the trajectory representations and heuristics are applied to the TIFs to determine if an interaction event has occurred, such as a potential illegal drug deal involving two or more pedestrians.

19 Claims, 14 Drawing Sheets

(56) References Cited

OTHER PUBLICATIONS

Felzenszwalb et al., "Object Detection with Discriminatively Trained Part Based Models," IEEE Transactions on Pattern Analysis and Machine Intelligence, vol. 32, No. 9, Sep. 2010.
Luvison et al., "Automatic Detection of Unexpected Events in Dense Areas for Video surveillance Applications, Video Surveillance", Prof. Weiyao Lin (Ed.), ISBN: 978-953-307436-8, InTech, Doi: 10.5772/15528 (2011). Available from: http://www.intechopen.com/books/video-surveillance/automatic-detection-of-unexpected-events-in-dense-areas-for-videosurveillance-applications.
Stauffer et al., "Adaptive Background Mixture Models for Real-Time Tracking," in Proc. IEEE Int. Conf. Comput. Vis. Pattern Recog., vol. 2, pp. 246-252, 1999.

\* cited by examiner

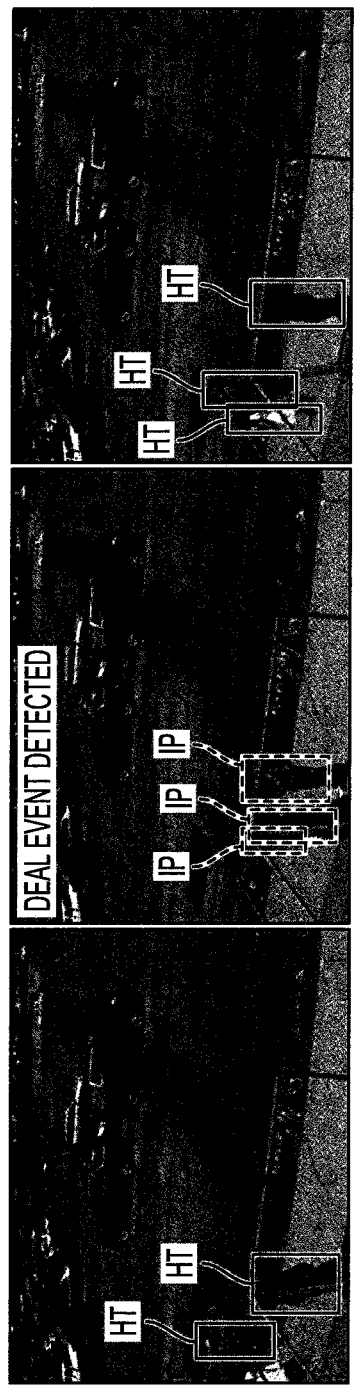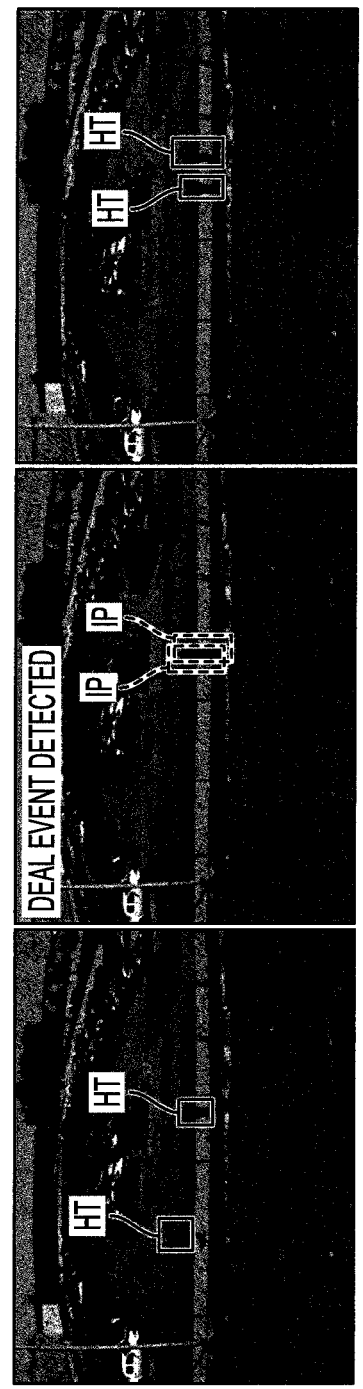

METHOD AND SYSTEM FOR DETECTING THE OCCURRENCE OF AN INTERACTION EVENT VIA TRAJECTORY-BASED ANALYSIS

BACKGROUND

This disclosure relates to image processing methods and systems for the detection of events including an interaction of two or more objects, such as, but not limited to, two or more pedestrians. More specifically, this disclosure, and the exemplary embodiments described herein, relates to the detection of potentially illegal activity involving two or more people, such as, but not limited to, a potential drug deal between two people and the notification of a central processing system or other party regarding the detected event.

Police and Public Safety data is growing at an astounding rate, and is expected to double every two years. Some data currently collected originates from a wide variety of sources, including the emergency telephone response system 911, CAD (Computer-Aided Dispatch), mobile, FBR (Field-Based Reporting), RMS (Record Management Sources), Jail, Radio, GPS (Global Positioning Systems) and other police and public safety systems. In addition, many cities have video camera surveillance systems which are manually monitored and/or accessed by personal after a crime has been committed or incident has occurred where further review of the crime or incident is necessary and/or warranted.

One currently available system offered by Xerox® and referred to as a Police Business Intelligence (PBI) system, is an information discovery tool for use with public safety agencies. PBI provides enhanced capabilities for data integration, analysis, visualization and distribution of information within and across agencies. PBI can assimilate data from all interconnected departments' databases as well as external sources to provide actionable insight for public safety commanders, allowing for rapid, fact-based decision making.

Provided herein are automated methods and systems for detecting an occurrence of an interaction event of two or more pedestrians using a video camera towards a surveilled area.

INCORPORATION BY REFERENCE

FELZENSZWALB et al., "Object Detection with Discriminatively Trained Part Based Models," IEEE Transactions on Pattern Analysis and Machine Intelligence, Vol. 32, No. 9, September 2010;

LUVISON et al., "Automatic Detection of Unexpected Events in Dense Areas for Video surveillance Applications, Video Surveillance", Prof. Weiyao Lin (Ed.), ISBN: 978-953-307-436-8, InTech, DOI: 10.5772/15528 (2011). Available from: http://www.intechopen.com/books/video-surveillance/automatic-detection-of-unexpected-events-in-dense-areas-for-videosurveillance-applications; and STAUFFER et al., "Adaptive Background Mixture Models for Real-Time Tracking," in Proc. IEEE Int. Conf. Comput. Vis. Pattern Recog., vol. 2, pp. 246-252, 1999, are incorporated herein by reference in their entirety.

BRIEF DESCRIPTION

In one embodiment of this disclosure, described is a computer-implemented method for automatically detecting an occurrence of an interaction event of two or more people concurrently present in a surveilled area using a video camera directed towards the surveilled area, the method comprising: a) acquiring a video stream from the video camera, the video stream including a temporal sequence of video frames including the surveilled area within a field of view (FOV) associated with the video camera; b) detecting and tracking two or more people within a common temporal sequence of video frames included in the video stream, and generating a trajectory of each person tracked within the first common temporal sequence of video frames; c) processing the trajectories of the tracked people to extract one or more trajectory interaction features (TIFs) associated with the trajectories of the two or more people tracked within the first common temporal sequence of video frames; and d) applying predefined heuristics to the extracted TIFs to detect an interaction event associated with the predefined heuristics has occurred between at least two people of the two or more people tracked within the first common temporal sequence of video frames.

In another embodiment of this disclosure, described is a video system for automatically detecting an occurrence of an interaction event of two or more people concurrently present in a surveilled area comprising: a video camera with an associated FOV (field-of-view) directed towards the surveilled area; and a video processing system operatively connected to the video camera, the video processing system configured to: a) acquire a video stream from the video camera, the video stream including a temporal sequence of video frames including the surveilled area within the FOV associated with the video camera; b) detect and track two or more people within a first common temporal sequence of video frames included in the video stream, and generate a trajectory of each person tracked within the first common temporal sequence of video frames; c) process the trajectories of the tracked people to extract one or more trajectory interaction features (TIFs) associated with the trajectories of the two or more people tracked within the first common temporal sequence of video frames; and d) apply predefined heuristics to the extracted TIFs to detect an interaction event has occurred between at least two people of the two or more people tracked within the first common temporal sequence of video frames.

In still another embodiment of this disclosure, described is a video system for automatically detecting an occurrence of an interaction event of two or more objects concurrently present in a surveilled area, the interaction event associated with an illegal drug deal between the two or more objects, comprising: a video camera with an associated FOV (field-of-view) directed towards the surveilled area; and a video processing system operatively connected to the video camera, the video processing system configured to: a) acquire a video stream from the video camera, the video stream including a temporal sequence of video frames including all or part of the surveilled area within all or part of the FOV associated with the video camera; b) detect and track two or more objects within a first common temporal sequence of video frames included in the video stream, and generate a trajectory of each object tracked within the first common temporal sequence of video frames; c) process the trajectories of the tracked objects to extract one or more trajectory interaction features (TIFs) associated with the trajectories of the two or more objects tracked within the first common temporal sequence of video frames, the TIFs including one or more of a position, a velocity and a relative distance associated with the two or more objects within the first common temporal sequence of video frames; and d) apply predefined heuristics to the extracted TIFs to detect an interaction event has occurred between at least two objects of the two or more objects tracked within the first common temporal sequence of video frames, the predefined heuristics including a velocity threshold and a proximity threshold associated with the two or more objects tracked within the first common temporal sequence of video frames, wherein steps b)-d) are repeated for a second common temporal sequence of video frames, distinct from the first common temporal sequence of video frames, to determine if the interaction event has occurred between at least two objects of the two or more objects tracked within the second common temporal sequence of video frames.

BRIEF DESCRIPTION OF THE DRAWINGS

FIG. 5A illustrates pedestrian location TIFs for pedestrians P1 and P6, FIG. 5B illustrates a relative distance TIF, indicating the relative distance between pedestrians P1 and P6, and FIG. 5C illustrates velocity TIFs for pedestrians P1 and P6, according to an exemplary embodiment of this disclosure.

FIG. 6A illustrates pedestrian location TIFs for pedestrians P2 and P3, FIG. 6B illustrates a relative distance TIF, indicating the relative distance between pedestrians P2 and P3, and FIG. 6C illustrates velocity TIFs for pedestrians P2 and P3, according to an exemplary embodiment of this disclosure.

FIG. 7A illustrates pedestrian location TIFs for pedestrians P1 and P5, FIG. 7B illustrates a relative distance TIF, indicating the relative distance between pedestrians P1 and P5, and FIG. 7C illustrates velocity TIFs for pedestrians P1 and P5, according to an exemplary embodiment of this disclosure.

FIGS. 8A, 8B and 8C are examples of processed mid-field video, according to an exemplary embodiment of this disclosure, detecting a potential drug deal event and labelling the relevant video frame(s) where the event occurred.

FIGS. 9A, 9B and 9C are examples of processed far-field video, according to an exemplary embodiment of this disclosure, detecting a potential drug deal event and labeling the relevant video frame(s) where the event occurred.

FIG. 11A illustrates pedestrian location TIFs for pedestrians P1 and P6, FIG. 11B illustrates relative distance TIFs, indicating the relative distance between pedestrians P1 and P6, and FIG. 11C illustrates velocity TIFs for pedestrians P1 and P6, according to an exemplary embodiment of this disclosure.

FIG. 12A illustrates pedestrian location TIFs for pedestrians P12 and P13, FIG. 12B illustrates relative distance TIFs, indicating the relative distance between pedestrians P12 and P13, and FIG. 12C illustrates velocity TIFs for pedestrians P12 and P13, according to an exemplary embodiment of this disclosure.

FIG. 13A illustrates pedestrian location TIFs for pedestrians P11 and P12, FIG. 13B illustrates relative distance TIFs, indicating the relative distance between pedestrians P11 and P12, and FIG. 13C illustrates velocity TIFs for pedestrians P11 and P12, according to an exemplary embodiment of this disclosure.

DETAILED DESCRIPTION

Figure 1:
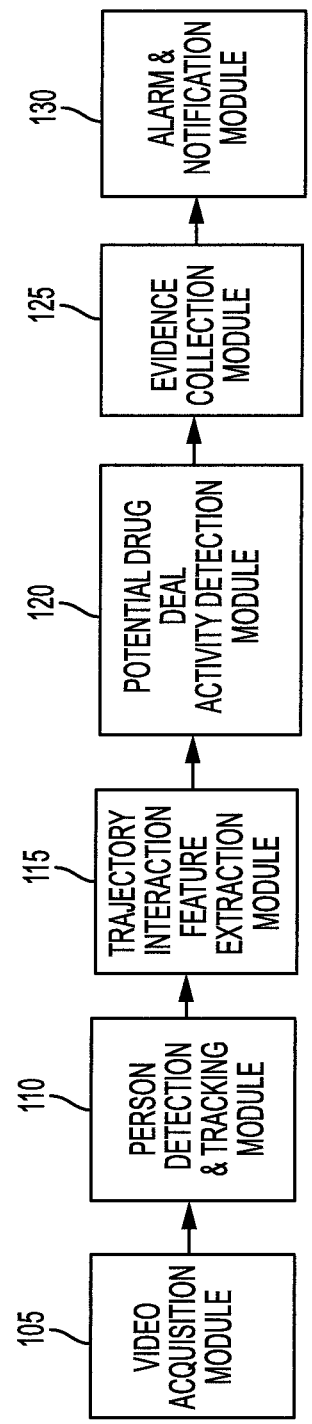
FIG. 1 is a diagram of a system for automatically detecting an occurrence of an interaction event of two or more people concurrently present in a surveilled area according to an exemplary embodiment of this disclosure.

The present disclosure provides a method and system for detecting event(s) including an interaction of two or more objects, such as, but not limited to, potential drug deal activity involving two or more pedestrians via trajectory-based analysis. When supplied with proper camera calibration information or direct estimation of human heights/widths in pixels, this method can be applied effectively to surveillance videos ranging from near-field/mid-field view to far-field view. An exemplary embodiment of the disclosed system is shown in FIG. 1 and includes:

A Video Acquisition Module 105, which acquires video of a scene being surveilled;

A Person Detection and Tracking Module 110, which detects the presence of person(s), tracks him/her/them in the entire field of view or in pre-determined regions in the scene, and reports the (on-going) trajectory of tracked person(s);

A Trajectory Interaction Feature Extraction Module 115, which analyzes the trajectories of tracked persons and extracts trajectory interaction features (TIFs) from multiple trajectories that co-occur in the scene;

A Potential Drug Deal Activity Detection Module 120, which determines whether a potential drug deal activity has occurred through rule-based analysis on the extracted TIFs;

An Evidence Collection Module 125, which collects the temporal evidence of detected potential drug deal events to determine the probability or level of confidence that a drug deal activity has occurred; and An Alarm and Notification Module 130, which alerts and notifies a central system or party of interest of the detected event.

More detailed description about each module and how they work together as a system to accomplish the detection of potential drug deal events are presented below.

Video Acquisition Module (105)

Figure 2A:
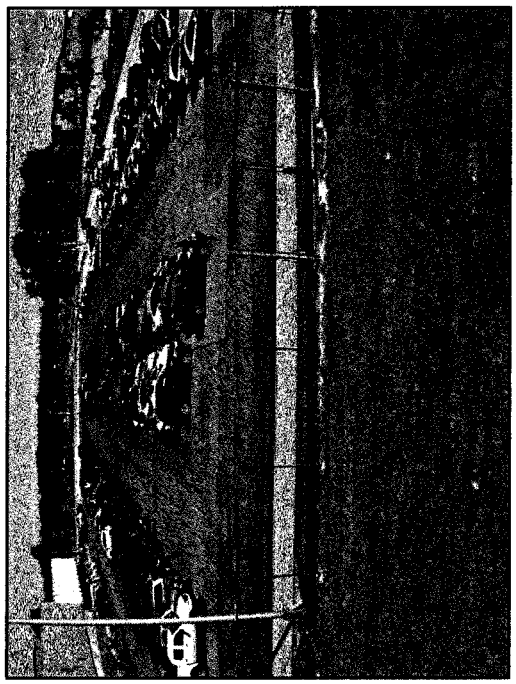
FIGS. 2A and 2B are images captured of surveilled areas using a near/mid FOV (field-of-view) video camera (FIG. 2A) and a far FOV video camera (FIG. 2B).
Figure 2B:
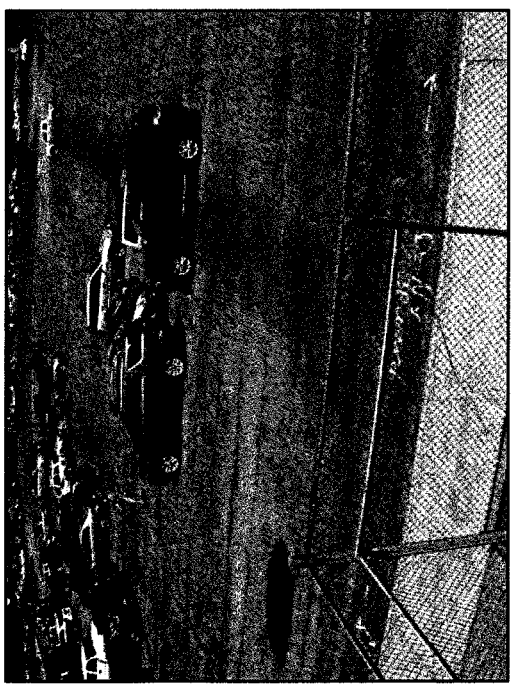

The Video Acquisition Module 105 includes a camera that acquires video of a scene being surveilled. It is to be understood that it is within the scope of this disclosure and the exemplary embodiments described herein that video and FOVs associated with the acquired video can include near-field/mid-field/overhead views, as well as other video and FOVs from various distances and perspectives. Example video frames of the field of views of a near-field/mid-field security camera and a far-field security camera are shown in FIGS. 2A and 2B. The acquired videos are streamed or archived and analyzed by the disclosed system to detect occurrences of potential drug deal activity. The camera does not need to be specialized and can be a typical visible or NIR (Near Infrared) video surveillance camera operating at conventional frame rates, for example as 15, 30 or 60 frames/sec and resolutions such as 1920×1080, 1280×1024, 1280×720, 1280×960, 1280×1024, 1108×832, 2048×1536 pixels. The acquired videos can be streamed/streaming to the analysis modules discussed later to perform real-time or near real-time detection of potential drug deal events (referred as on-line processing later). They can also be archived and transmitted to the analysis modules to perform detection of potential drug deal events (referred as off-line processing).

A Person Detection and Tracking Module (110)

The Person Detection and Tracking Module 110 analyzes the acquired videos (on-line or off-line) and detects the presence of person(s), tracks him/her/them in the entire field of view or in pre-determined regions in the scene, and reports the (on-going) trajectory of tracked person(s). Generally, two different types of tracking can be implemented, either (a) multiple Single Object Tracking (SOT) algorithms, or (b) a single Multiple Object Tracker (MOT) algorithm can be used. See Shuangyan Yi, Zhenyu He, Xinge You, and Yiu-Ming Cheung, "Single object tracking via robust combination of particle filter and sparse representation," Signal Processing, Vol. 110, pp. 178-187, (2014); and Shunli Zhang, Sicong Zhao, Yao Sui, Li Zhang, "Single Object Tracking With Fuzzy Least Squares Support Vector Machine," IEEE Transactions on Image Processing, 2015, Volume: 24 Issue: 12, Pages: 5723-5738, herein fully incorporated, for additional information on SOT algorithms. See Chen-Chien Hsu, Yung-Ching Chu, Ming-Chih Lu, "Hybrid multiple-object tracker incorporating Particle Swarm Optimization and Particle Filter," 2013 International Conference on System Science and Engineering (ICSSE), Pages: 189-193 and Hamed Moradi Pour and Saeid Fazli, "An Advanced Real-Time Multiple Object Tracker in Variant Outdoor Environments," J. Appl Computat Math 2012, vol 1, issue 5, herein fully incorporated, for additional information on MOT algorithms.

In the first case (multiple SOT), detection is performed once for each person, at which point a single object tracker is initialized. According to this approach, detection can be limited to specific regions of interest, which may include for example expected points of entrance into the field of view of the camera. Detection may be performed in different ways. Temporal differencing algorithms can detect objects in motion in the scene; alternatively, background subtraction, which requires the estimation of the stationary scene background, followed by subtraction of the estimated background from the current frame can detect foreground objects (which include objects in motion). The output of either approach is a binary mask with the same pixel dimensions as the input video, and having values equal to 0 where no motion/foreground objects are detected and values equal to 1 at pixel locations where motion/foreground objects are detected. This detection mask is usually post-processed via morphological operations which discard detected objects with size and orientation outside pre-determined ranges determined by the geometry of the capture. Alternatively, computer vision techniques for object recognition and localization can be used on still images (e.g., single video frames). These techniques typically entail a training stage where the appearance of multiple sample objects in a given feature space (e.g., Deep features, Harris Corners, SIFT, SURF, HOG, LBP, deep or learned features, etc.) is fed to a classifier (e.g., Neural Net, decision tree, SVM, EM, k-NN, clustering algorithms, etc.) that is trained on the available sample feature representations. The trained classifier is then applied to features extracted from frames of interest and outputs the parameters of bounding boxes (e.g., location, width and height) surrounding the matching candidates. Once a person has been detected, a SOT is assigned to the person. SOTs determine the location of the object being tracked by building appearance models of the image region where the detection was triggered, and finding candidate regions in subsequent frames with visual characteristics that best match the appearance of the initial detection. Examples of such trackers include template-based, mean-shift, particle filter, the circulant shift kernel (CSK), and the adaptive color attributes tracker. According to an exemplary embodiment of the algorithm, an adaptive color attributes tracker is used. However, the provided method and system is tracker-agnostic.

In the second scenario (single MOT), detection is performed on a frame-by-frame basis across the full field of view. Although the same detection techniques as described above can be used, and since an MOT algorithm continuously relies on monitoring the detections, motion-based detectors are not as well-suited to operate in this scenario. An MOT takes the full set of detections at each frame, and models detection errors and target motions to link detections with the most likely trajectories. In essence, an MOT solves a correspondence problem of the multiple detections across time.

The output of this module is a set of spatiotemporal sequences, one for each detected object, each describing the location, and possibly the size (in the form of a bounding box or a blob of connected pixels) of each of the people being tracked.

Trajectory Interaction Feature Extraction Module (115)

The Trajectory Interaction Feature Extraction Module 115 analyzes the trajectories of tracked persons (outputs from the Person Detection and Tracking Module 110) and extracts trajectory interaction features (TIFs) from multiple trajectories that co-occur in the scene. This module can be implemented in various forms (time-scales) depending on the applications and offerings. Described below are several options for this implementation.

Figure 3:
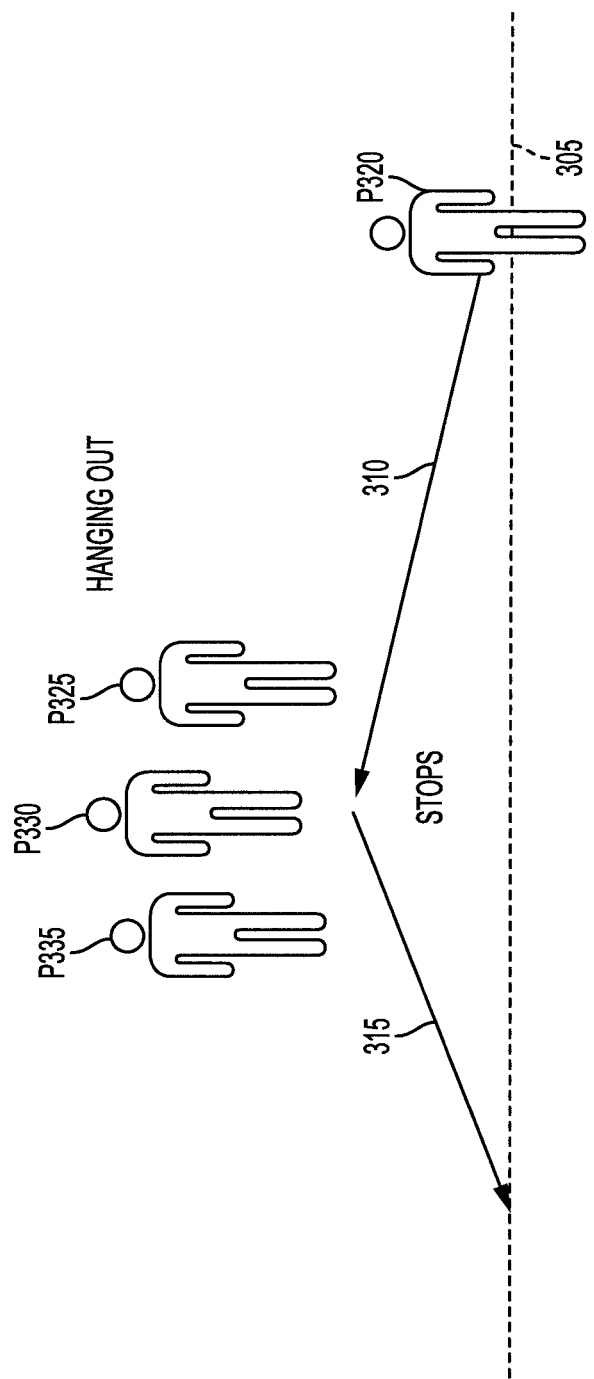
FIG. 3 is an illustration of an interaction event, i.e., potential drug deal event on/near a pedestrian walkway, from which heuristic rules are derived for operation on video-based trajectories associated with the pedestrians to detect the interaction event, according to an exemplary embodiment of this disclosure.

First, smoothing techniques are applied such as convolution, curve fitting, AR (Autoregressive), MA (Moving Average) or ARMA (Autoregressive-Moving-Average), etc., to smooth the tracked trajectories. The levels of smoothing depend on the performance/characteristics of the person tracker, and are application/module dependent. For the tracker used in our implementation, temporal smoothing over ~4 sec periods was sufficient. Many smoothing methods can work for this task. However, some may be more suited than others depending on the time-scale used in the module, which will be further discussed below. Note that smoothing significantly benefits the disclosed method and system because important features needed for this application are the velocities and the level of "stationarity" of the persons involved as shown in FIG. 3 which depicts a potential drug deal interaction event where pedestrians P325, P330 and P335 are "hanging out" and pedestrian P320 travels along path 305 to path 310, interacts with one or more of pedestrians P325, P330 and P335, then pedestrian P320 moves on, traveling along path 315 to path 305, or makes a U-turn and travels back towards the initial location of pedestrian P320 depicted in FIG. 3. Small levels of noise in a trajectory can get amplified when using it to compute velocities. Once the trajectories are smoothed, relevant features are extracted from the smoothed trajectories for later use. The activity of our interest, illustrated in FIG. 3, involves at least two persons interacting with each other. Hence relevant features must be extracted from single and multiple trajectories. In particular, temporal features extracted include individual position, individual velocity, and relative distances between persons of interest. These features can be extracted in an offline or online manner, as described below, depending on the application, and these options affect several choices for implementing this module's algorithm.

Off-line operation: this assumes that the full trajectory has been extracted using the preceding module, i.e., the Person Detection and Tracking Module 110. In this scenario, simpler methods can be used for smoothing and feature extraction since all data is available at the time of processing. This, however, limits the usage of the disclosed method and system to after-the-fact alerts, e.g., for providing evidence in court or to notify authorities of a location or person(s) of interest. For smoothing, all methods mentioned above (e.g., curve fitting, convolution or AR) can be applied here. For feature extraction, using two trajectories as an example, let smoothed trajectory, $(i_t^A, j_t^A)$, $t=t_S^A, \ldots, t_E^A$ correspond to person A; and smoothed trajectory, $(i_t^B, j_t^B)$, $t=t_S^B, \ldots, t_E^B$ correspond to person B, where (i,j) are the row and column pixel coordinates, respectively, and t is time (or frame number), with S and E denoting start and end times, respectively, for a given person. In one embodiment, the Trajectory Interaction Features (TIFs) between A and B may be five temporal profiles of a length equal to the overlap time duration of their trajectories. In short, in this embodiment, the TIFs are the positions and velocities of both persons and the distance between them during the time periods that both are being tracked. For the case where two persons have never co-appeared in the videos, no further analysis is performed because the overlap time duration is zero. The overlap time duration and five temporal profiles are expressed mathematically below.

Overlap time duration, $\min(t_E^A, t_E^B) - \max(t_S^A, t_S^B)$, (TIF) position of person A at time t, $p_t^A = (i_t^A, j_t^A)$,
(TIF) position of person B at time, $p_t^B = (i_t^B, j_t^B)$,
(TIF) velocity of person A at time, $v_t^A = \sqrt{(i_t^A - i_{t-1}^A)^2 + (j_t^A - j_{t-1}^A)^2}$,
(TIF) velocity of person B at time, $v_t^B = \sqrt{(i_t^B - i_{t-1}^B)^2 + (j_t^B - j_{t-1}^B)^2}$,
(TIF) relative distance between the persons at time t $d_t^{AB} = \sqrt{(i_t^A - i_t^B)^2 + (j_t^A - j_t^B)^2}$.

Note that, in some embodiments, the outputs of the person detection and tracking module 110 may include the size (e.g., bounding box) of the detected person in addition to his/her position. In alternative embodiments, TIFs can be computed via more elaborate formulae. In one embodiment, instead of computing the TIF $d_t^{AB}$ using Euclidean distances between two points (the positions of person A and person B), TIF $d_t^{AB}$ can represent the "distance" between two regions (e.g., bounding boxes of A & B or blobs of A & B). According to this embodiment, TIF $d_t^{AB}$ can be computed as the minimal distance between two regions or minimal distance between two regions along a preselected direction (e.g., road plane). The benefit of this extended definition of distance is that it can take into account the pose (due to cameras or persons) of the objects. This is especially useful for near-field/mid-field views. In the case of far-field view, the bounding boxes of persons are typically small and either embodiment would work well.

Similarly, in some embodiments, the TIFs describing the velocity of motion of a person may be extended from point calculation to region calculation. As an example, instead of calculating velocity as the frame-to-frame positional change of centroids of the detected human blob, it can be estimated as a function (e.g., the average, weighted average, etc.) of the velocities of various part of the human blob (e.g., using optical flow calculation of the human blob frame-to-frame). This embodiment would be particularly efficient when the camera view is near-field/mid-field where we would prefer to use the true velocity of person rather than the false velocity of the person coming from upper body movement. In such scenario, the average speed as estimated by the frame-to-frame displacement of the centroid of the detected human blob (centroids may move due to upper body movement) would not be as accurate as averaging velocities of various parts of the human.

Figure 4:
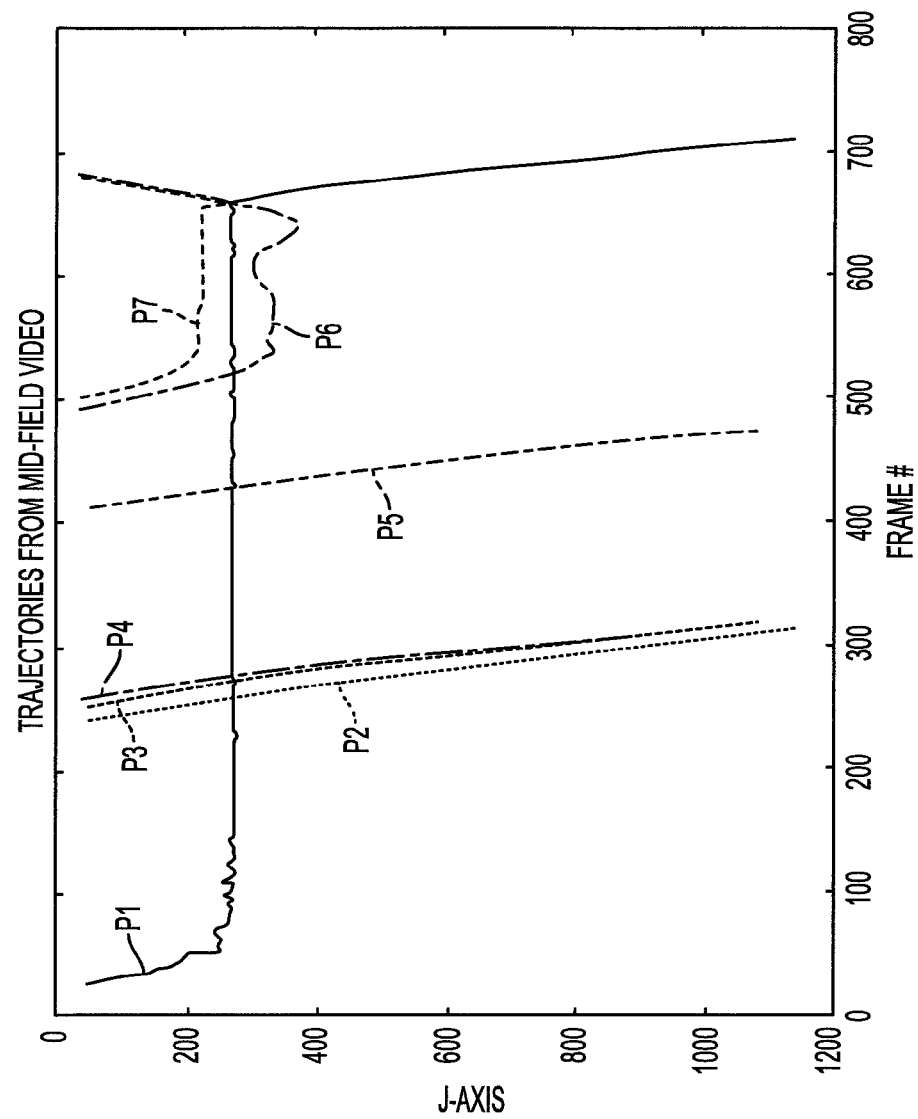
FIG. 4 is a plot of trajectories generated from mid-field video, the plot graphs a j-axis representative of the pixel location of several pedestrians vs. a corresponding frame number of the processed video, according to an exemplary embodiment of this disclosure.

FIG. 4 graphically illustrates an analysis of the mid-field video of the scene in FIG. 2(a). In FIG. 2(a) the pedestrian walkway is roughly aligned with the j axis shown in FIG. 4, so for simplicity plotted is the j coordinate of the trajectory of each person tracked as a function of time in FIG. 4, i.e., frame number. 7 pedestrians were tracked in this example where the pedestrians entered the scene from the right (high j). If they continued along the walk way they exit the scene with a low j value. Denoting the persons as P1, P2, P3, P4, P5, P6 and P7 in the graph, individually, the traces can be understood as follows:

Persons P2, P3 and P4 walked continuously along the walkway without pause.

Person P1 (which is person A for an analysis provided below) enters the scene and remains at a spot for a relatively long time. Hence, person P1 is a potential dealer.

Persons P6 and P7 enter from the right, have a dwell time, and exit to the right.

Figure 5A:
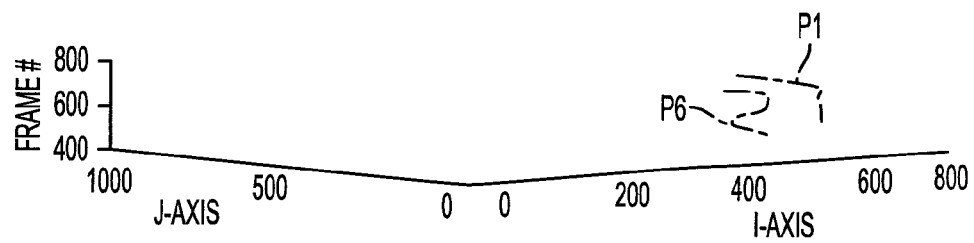
FIGS. 5A, 5B and 5C are illustrations of trajectory interaction features (TIFs) generated for pedestrian P1 and P6 trajectories, shown in FIG. 4, indicating a probable drug deal, where
Figure 5B:
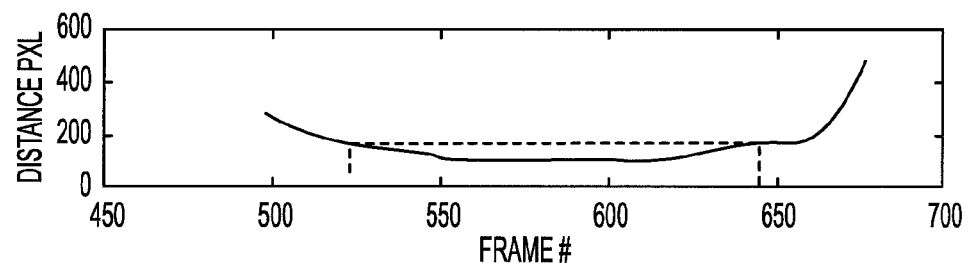
Figure 5C:
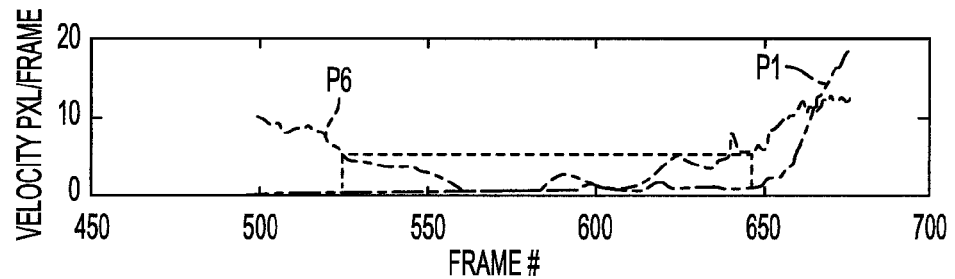

FIGS. 5A-5C show the five TIFs between person P1 (A) and person P6, which is referred to as B for understanding the TIFs and how they relate to recognizing a drug deal. FIG. 5A shows trajectories $p_t^A$ & $p_t^B$ plotted for their overlap time duration, roughly from frame 500~700. FIG. 5B shows the distance $d_t^{AB}$ between the pair as a function of time over the overlap duration time. It can be seen that for a period of time, roughly frames 525 to 650, they are quite close (<150 pixels away). FIG. 5C shows their velocities $v_t^A$ and $v_t^B$ where it is indicated that they are nearly stationary (velocity <5 pixels/frame) for that period of time. By comparing these metrics to the metrics of other pedestrians, it can be understood how they can be used to identify a drug deal.

Figure 6A:
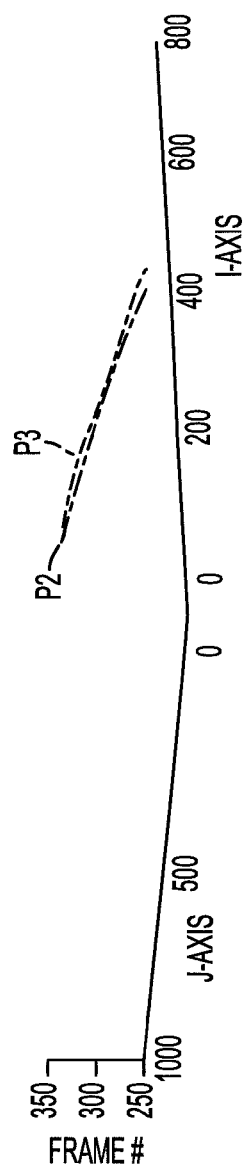
FIGS. 6A, 6B and 6C are illustrations of TIFs generated for pedestrians P2 and P3 trajectories shown in FIG. 4, indicating a probable walk-together-pair of pedestrians, where
Figure 6B:
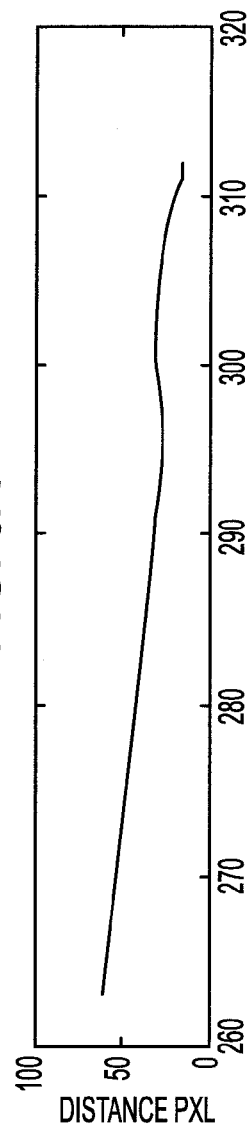
Figure 6C:
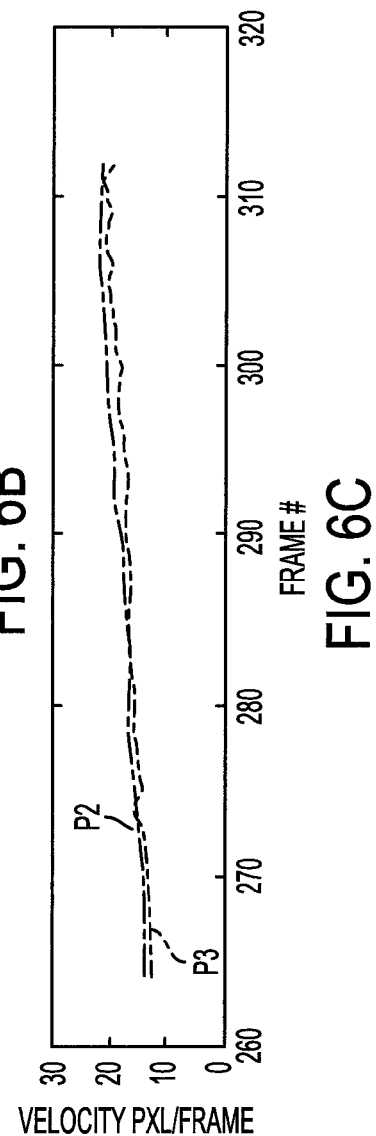

For comparison, consider FIGS. 6A-6C which show the TIFs for person P2 and person P3. Their trajectories are shown in FIG. 6A. FIG. 6B shows that they stay in the range of 20 to 60 pixels from each other throughout their complete overlap time duration, and FIG. 6C shows their velocities are almost identical (≈15 pixels/frame) during that time period. These metric can be used to detect that this pair is walking together throughout the scene.

Figure 7A:
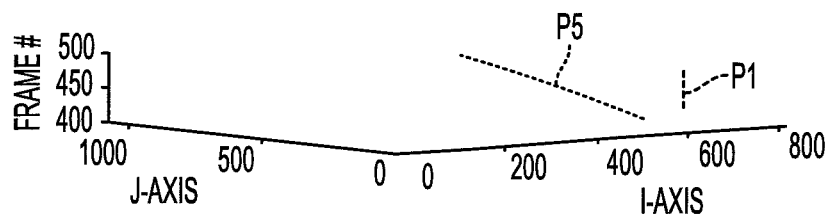
FIGS. 7A, 7B and 7C are illustrations of TIFs generated for pedestrians P1 and P5 trajectories shown in FIG. 4, indicating a probably pass-by-pair of pedestrians, where
Figure 7B:
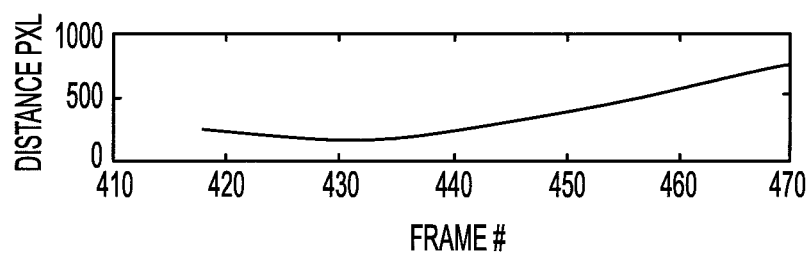
Figure 7C:
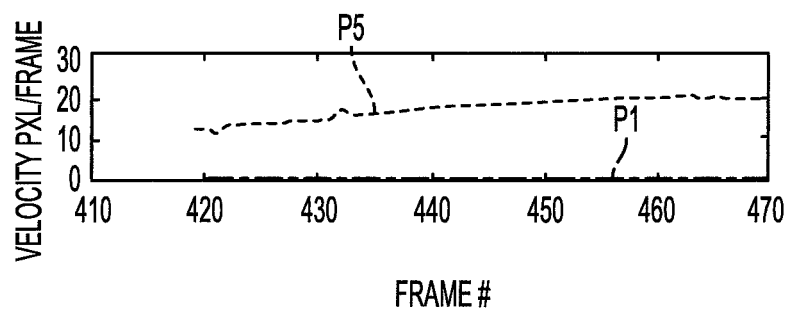
Figure 10:
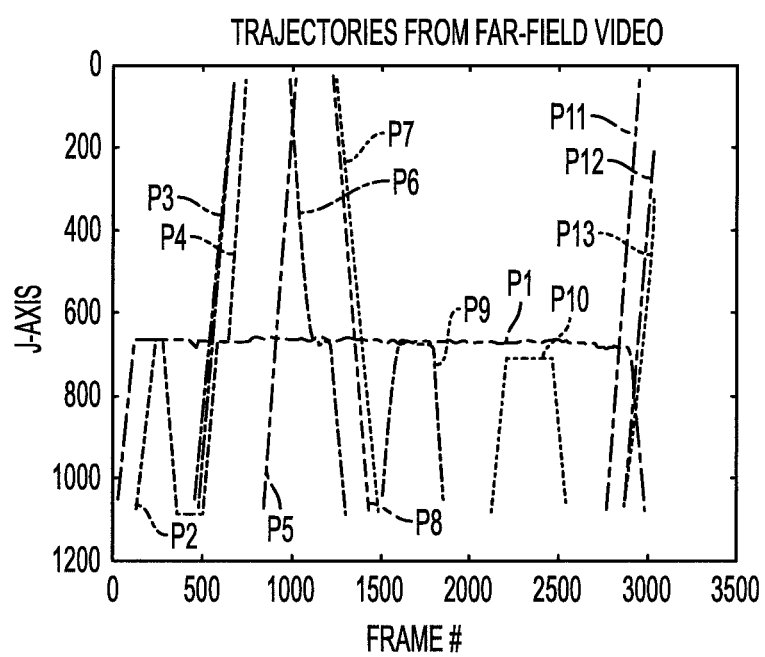
FIG. 10 is a plot of trajectories generated from far-field video, the plot graphs a j-axis representative of the pixel location of several pedestrians vs. a corresponding frame number of the processed video, according to an exemplary embodiment of this disclosure.
Figure 11A:
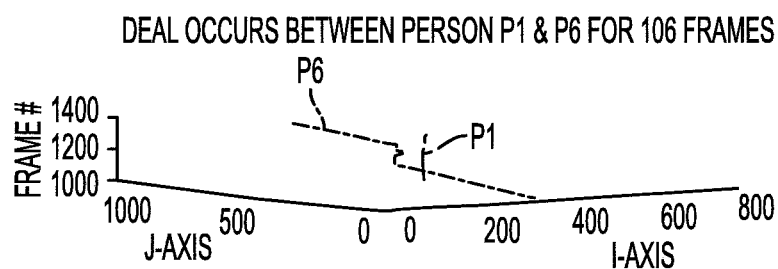
FIGS. 11A, 11B and 11C are illustrations of TIFs generated for pedestrian P1 and P6 trajectories, shown in FIG. 10, indicating a probable drug deal where
Figure 11B:
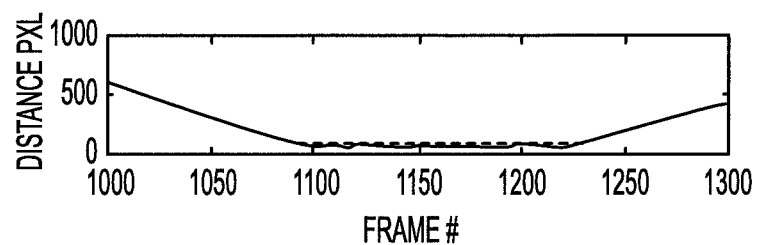
Figure 11C:
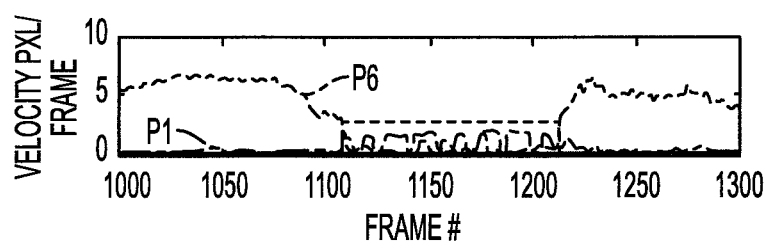
Figure 12A:
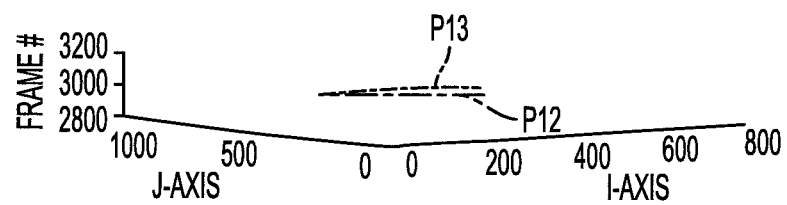
FIGS. 12A, 12B and 12C are illustrations of TIFs generated for pedestrian P12 and P13 trajectories, shown in FIG. 10, indicating a probable walk-together-pair where
Figure 12B:
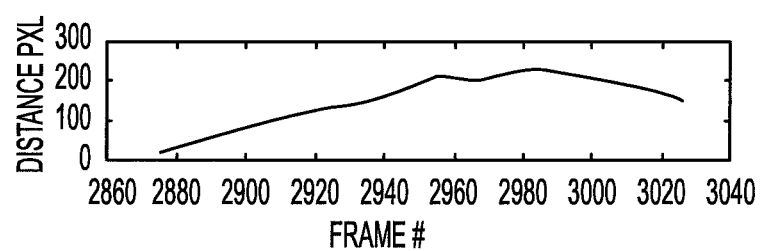
Figure 12C:
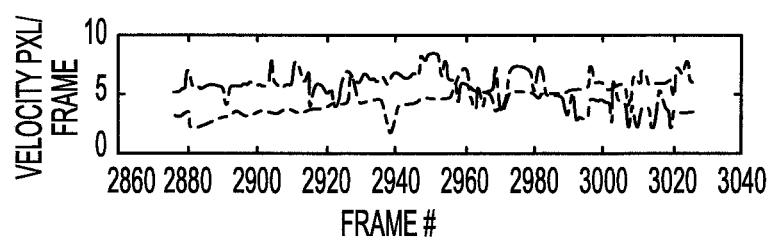
Figure 13A:
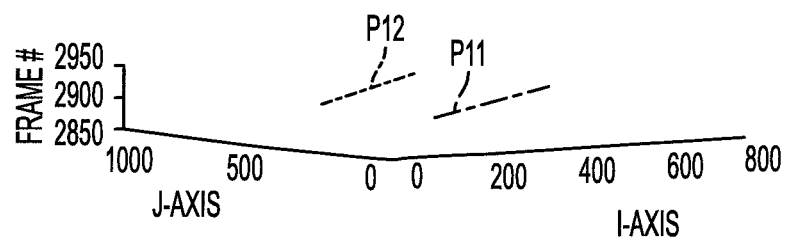
FIGS. 13A, 13B and 13C are illustrations of TIFs generated for pedestrian P11 and P12 trajectories, shown in FIG. 10, indicating a probable walk-follow-pair where
Figure 13B:
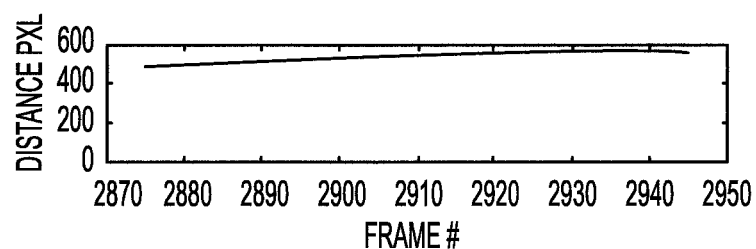
Figure 13C:
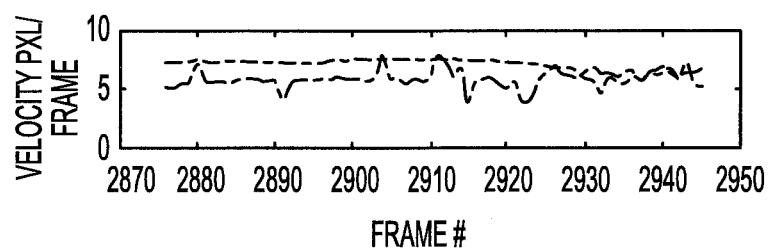

FIGS. 7A-7C provides another example which shows the TIFs for person P1 and person P5 in a "pass-by pair" scenario. The plots of FIGS. 7A-7C show that the people involved tend to be at a significant distance from each other (FIG. 7B), and they don't have a common period of near zero velocity. From these trajectory features, it can be concluded that person P5 passed by person P1 without any interaction taking place. These are some example pair-wise TIFs from various two-person trajectory analyses. By performing exhaustive pair-wise trajectory analyses and performing the algorithms discussed below, drug deal actions are detectable and were detected in test videos.

On-line operation: this assumes that videos are streaming into the disclosed system for continuous processing. In one embodiment where real-time person tracking can be achieved, the trajectories are received up to the current time. In this scenario, smoothing techniques such as AR or MA may be more suitable than curve fitting since these smoothing methods only require a small amount of buffering to store a small amount of recent data. For feature extraction, the process is the same as for the off-line operation with the exception that the length of the trajectory interaction features may change over time, growing in length as persons start to co-appear and eventually stop at the same length as the off-line operation once the interaction stops. Running the module on-line provides better offerings including both real-time alerts and after-the-fact alerts. However, the processing requirements are much higher and the algorithm has to be more conservative in collecting evidence before raising the alert.

A Potential Drug Deal Activity Detection Module (120)

The Potential Drug Deal Activity Detection Module 120 determines whether a potential drug deal activity has occurred through heuristic rule-based analysis on the extracted trajectory interaction features (outputs from Module 115). The illustration on FIG. 3 provides some intuition for the semantic rules needed to detect potential drug deal activity: approaching, stopping at proximity for a while, and leaving. All three sub-actions can be detected from analyzing the five temporal "trajectory interaction features" (TIFs) extracted from the Trajectory Interaction Feature Extraction Module 115. According to an exemplary implementation, the following rules are applied for detecting potential drug deal activity.

Let $e_t^{AB}$, $t=\max(t_S^A+1, t_S^B+1), \ldots, \min(t_E^A, t_E^B)$ be an evidence vector indicating that A and B are participating in a drug deal action. Its state in time is determined by:

$$e_t^{AB} = \begin{cases} 1 & \text{if } \max(v_t^A, v_t^B) < \eta_v(FOV) \cap d_t^{AB} < \eta_d(FOV) \\ 0 & \text{otherwise} \end{cases},$$

where $e_t^{AB}=1$ is interpreted in the Evidence Collection Module 125 described below as evidence supporting that a drug deal action has occurred. The vector is post processed with additional temporal filtering such as median filtering to remove detection of low confidence events. Note the evidence vector dependency on the velocity threshold n, and the proximity threshold $\eta_d$ on the Field Of View (FOV). As shown in FIGS. 2A and 2B, the two views have a scale 2~3× difference near the sidewalk areas. The algorithm needs to comprehend that in order to be robust across various fields of view in practice. One solution for this is to perform camera calibration in the field for all the cameras and operate the disclosed trajectory analysis in physical units. Alternatively, simple approximation can be done without camera calibration due to information acquired as the system detects and tracks persons. The collected sizes of tracked humans (e.g., heights or widths) can be used as a simple surrogate for adjusting thresholds from one camera view to another.

Although a simple heuristic rule of setting lower bounds to velocity and distance among persons of interest works well, other rules can be applied or adapted over time. For example, the threshold can also be size-dependent. This can be useful to rule out the persons that are not likely to be involved in the drug deal (e.g., kids). For another example, group size may also be used as a filtering rule given that it is less likely to have a "crowd" interaction with a drug dealer.

An Evidence Collection Module (125)

The Evidence Collection Module 125 collects the temporal evidences of detected potential drug deal events (outputs from Module 120) to determine the probability or level of confidence that drug deal activity has occurred. In one exemplary embodiment, evidence is collected as follows. From the previous Event Detection Module 120, every time a single event of potential drug deal activity (if $e_t^{AB}$ has any non-zeros) is detected, a count is added to person A and person B about their involvement in the event, for example, the event duration and start/end time. A record of the counts is maintained indicating the number of detected events for those persons. When/if there are common persons that are involved with high counts of a detected event, it is likely that drug deal activity has occurred in the scene being surveilled. In another embodiment, evidence is accumulated in the following manner. For two individuals, if a sufficient overall count or run-lengths of 1's occur in e, then there is an indication that those persons may be involved in drug dealing activity. If similar evidence is acquired over time for other trajectories, then it is an indication of regular drug activity. In that case, the stationary person(s) may be the same over multiple e while the approaching and exiting persons can be the same or different. For example, in particular embodiments, trajectories of tracked people are processed by the Trajectory Interaction Feature Extraction Module 115 and analyzed by the Potential Drug Deal Activity Module 120 over more than one temporal sequence of video frames to determine if a potential drug deal event has occurred.

Alarm and Notification Module (130)

The Alarm and Notification Module 130 alerts and notifies a central system or party of interest of the detected event when the evidence collection (outputs from Module 125) issues a high probability observation that a drug deal activity has occurred. Appropriate actions are taken based on the application.

Experimental Results

The disclosed method and system was implemented and tested on videos acquired from a surveillance system. A mix of simulated drug deal events and other irrelevant persons passing by were contained in two sets of videos acquired with a mid-field view FOV and a far-field view FOV. The velocity threshold $\eta_v$ and the proximity threshold $\eta_d$ for the mid-field view was 5 pixels/frame and 150 pixels, respectively; while the velocity threshold $\eta_n$ and the proximity threshold $\eta_d$ for the far-field view was 2.5 pixels/frame and 75 pixels, respectively. A scale of 2 was estimated from the difference of average human sizes between the two views.

FIGS. 8A-8C and FIGS. 9A-9C show examples of how videos analyzed were marked automatically by the disclosed method. It shows three samples frames: approaching (FIGS. 8A and 9A), drug deal in progress (FIGS. 8B and 9B), and leaving (FIGS. 8C and 9C), in the process of drug deal activities for mid-field and far-field videos. Note that boxes identified with a HT indicate bounding boxes provided by the human tracker. If the trajectory analysis module 120 detects a drug deal event, i.e., the time when $e_t^{AB} \neq 0$, a text label text "Deal Event Detected" is labeled on the upper left corner of the image frame. Additionally, the bounding boxes including those persons involved in the detected event are highlighted, for example, in the color Red (not shown) or identified with IP indicating they were an involved person. After the action is no longer detected, i.e., the time when $e_t^{AB} = 0$, the bounding boxes of tracked person are again identified by HT.

FIGS. 10-13 show results similar to those in FIGS. 4-7 but for far-field videos, which illustrates why the method and system works well.

Note that in the exemplary embodiment described, a drug deal action is detected through pair-wise TIFs. This approach can be easily extended to analysis on trajectories involving three or more persons. Furthermore, the exemplary embodiment described does not classify or categorize various actions that are not drug deal activity (e.g., walk together, pass-by, walk follow, . . . ;). However, further classification or categorization of interactions of people can be performed.

Figure 14A:
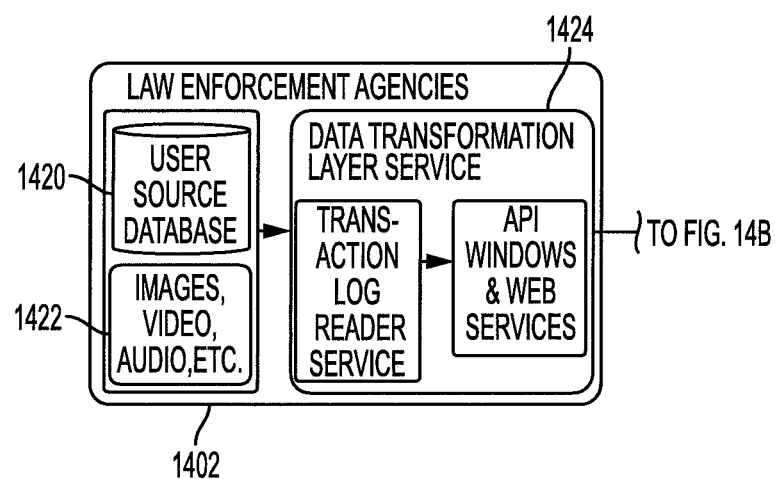
FIGS. 14A and 14B are a system diagram of a Police Business Intelligence (PBI) System including an Event Detection Module incorporating interaction event detection according to an exemplary embodiment of this disclosure.
Figure 14B:
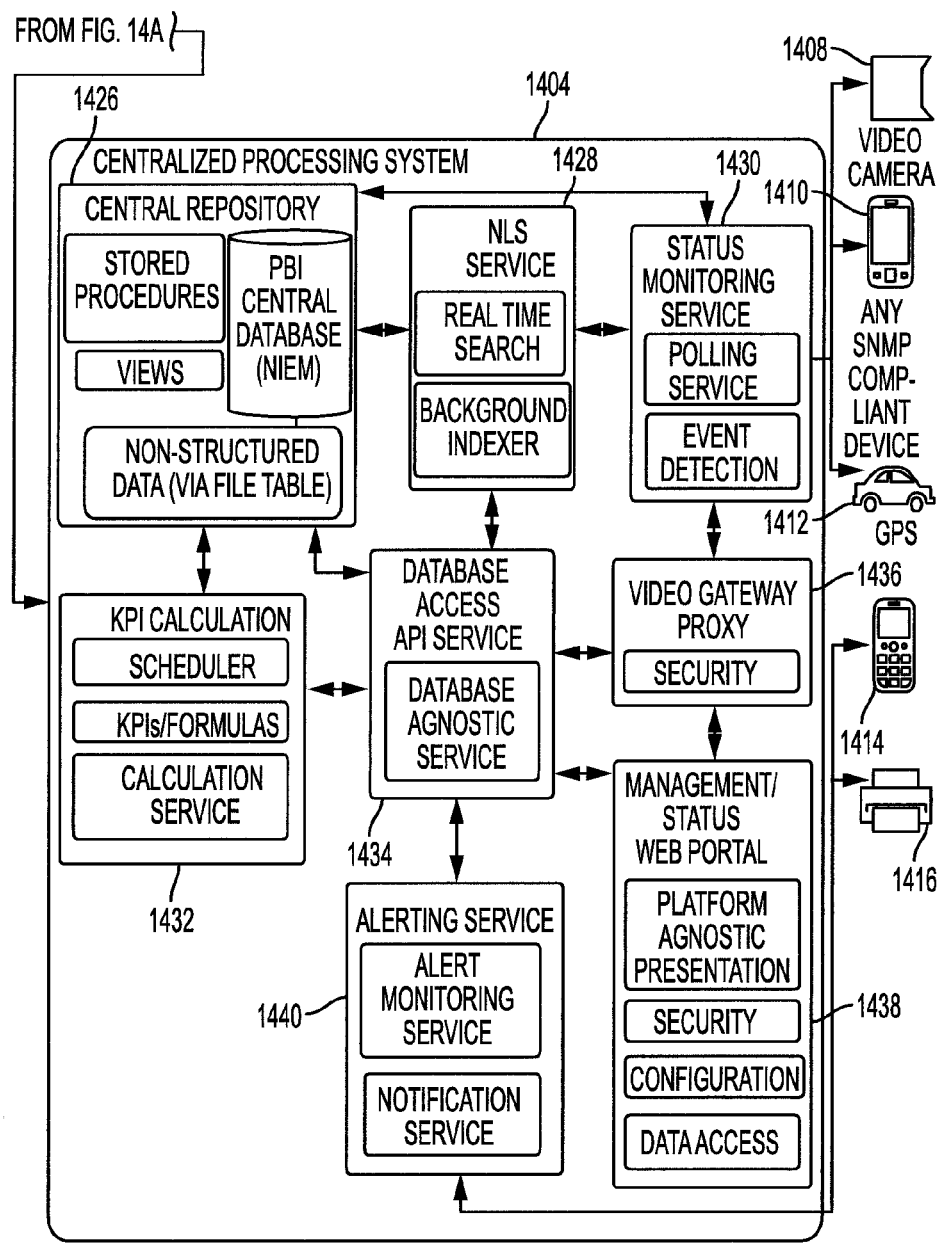

With reference to FIGS. 14A and 14B, provided is a system diagram of a Police Business Intelligence (PBI) system including an Event Detection Module incorporating event detection according to an exemplary embodiment of this disclosure. This system is provided to illustrate a manner of incorporating a method for automatically detecting an occurrence of an interaction event, such as a potential drug deal, including two or more people as described herein, into a central processing system for use with a central public safely and/or law enforcement system.

The PBI system includes a Centralized Processing System 1404 which is operatively connected to Law Enforcement Agencies 1402, one or more Video Cameras 1408, SNMP Compliant Devices 1410, Vehicle GPSs 1412, Mobile Communication Devices 1414 and a Printer 1416.

The Central Processing System includes a Central Repository Module 1426, a NLS (National Library Service) Module 1428, KPI (Key Performance Indicator) Calculation Module 1432, A Database Access Module 1434, Alerting Service Module 1440, a Status Monitoring Module 1430, a Video Gateway Proxy Module 1436 and a Management/Status Web Portal Module 1438. The Status Monitoring Module 1430 includes the processing of video acquired from one or more Video Cameras 1408 to detect an occurrence of an interaction event of two or more people, such as a potential drug deal, as previously described.

The Law Enforcement Agency Module 1402 includes a User Source Database 1420, Images/Video/Audio Database 1422 and Data Transformation Layer Service Module 1424.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for automatically detecting an occurrence of an interaction event of two or more people concurrently present in a surveilled area using a video camera directed towards the surveilled area, the method comprising:
   a) acquiring a video stream from the video camera, the video stream including a temporal sequence of video frames including the surveilled area within a FOV (field-of-view) associated with the video camera;
   b) detecting and tracking two or more people within a common temporal sequence of video frames included in the video stream, and generating a trajectory of each person tracked within the first common temporal sequence of video frames;
   c) processing the trajectories of the tracked people to extract one or more trajectory interaction features (TIFs) associated with the trajectories of the two or more people tracked within the first common temporal sequence of video frames; and
   d) applying predefined heuristics to the extracted TIFs to detect an interaction event associated with the predefined heuristics has occurred between at least two people of the two or more people tracked within the first common temporal sequence of video frames,
   wherein the TIFs include one or more of a position, a velocity and a relative distance associated with the two or more people within the first common temporal sequence of video frames, and the predefined heuristics applied in step d) include the calculation of an evidence vector state, the evidence vector state calculated as a function of a velocity threshold and a proximity threshold associated with the two or more people tracked within the first common temporal sequence of video frames.

2. The computer-implemented method for automatically detecting the interaction event of two or more people according to claim 1,
   wherein steps b)-d) are repeated for a second common temporal sequence of video frames, distinct from the first common temporal sequence of video frames, to determine if the interaction event has occurred between at least two people of the two or more people tracked within the second common temporal sequence of video frames.

3. The computer-implemented method for automatically detecting the interaction of two or more people according to claim 2, further comprising:
   e) collecting evidence of the detected interaction events in step d), the evidence including one or more of the number of occurrences of the detected interaction event, the number of occurrences of the detected interaction event associated with each of the two or more people detected within the first and second common temporal sequence of video frames, a time duration and start/end time associated with each detected interaction event, a calculated probability of the occurrence of the interaction event, and an indication of static or dynamic movement associated with each of the two or more people detected within the first and second common temporal sequence of video frames.

4. The computer-implemented method for automatically detecting the interaction event of two or more people according to claim 3, further comprising:
   f) communicating an alert to an operatively associated central system, the alert indicating one or more of the number of occurrences of the detected interaction event, the number of occurrences of the detected interaction event associated with each of the two or more people detected within the first and second common temporal sequence of video frames, a time duration and start/end time associated with each detected interaction event, a calculated probability of the occurrence of the interaction event, and an indication of static or dynamic movement associated with each of the two or more people detected within the first and second common temporal sequence of video frames.

5. The computer implemented method for automatically detecting the interaction event of two or more people according to claim 1, wherein the interaction event is an illegal drug deal between two or more people.

6. The computer implemented method for automatically detecting the interaction event of two or more people according to claim 5, wherein steps b)-d) are repeated for a second common temporal sequence of video frames, distinct from the first common temporal sequence of video frames, to determine if the interaction event has occurred between at least two people of the two or more people tracked within the second common temporal sequence of video frames.

7. The computer-implemented method for automatically detecting the interaction event of two or more people according to claim 6, further comprising:
   e) collecting evidence of the detected interaction events in step d), the evidence including one or more of the number of occurrences of the detected interaction event, the number of occurrences of the detected interaction event associated with each of the two or more people detected within the first and second common temporal sequence of video frames, a time duration and start/end time associated with each detected interaction event, a calculated probability of the occurrence of the interaction event, and an indication of static or dynamic movement associated with each of the two or more people detected within the first and second common temporal sequence of video frames.

8. The computer-implemented method for automatically detecting the interaction event of two or more people according to claim 7, further comprising:
   f) communicating an alert to an operatively associated central system, the alert indicating one or more of the number of occurrences of the detected interaction event, the number of occurrences of the detected interaction event associated with each of the two or more people detected within the first and second common temporal sequence of video frames, a time duration and start/end time associated with each detected interaction event, a calculated probability of the occurrence of the interaction event, and an indication of static or dynamic movement associated with each of the two or more people detected within the first and second common temporal sequence of video frames.

9. A video system for automatically detecting an occurrence of an interaction event of two or more people concurrently present in a surveilled area comprising:
   a video camera with an associated FOV (field-of-view) directed towards the surveilled area; and
   a video processing system operatively connected to the video camera, the video processing system configured to:
   a) acquire a video stream from the video camera, the video stream including a temporal sequence of video frames including the surveilled area within the FOV associated with the video camera;
   b) detect and track two or more people within a first common temporal sequence of video frames included in the video stream, and generate a trajectory of each person tracked within the first common temporal sequence of video frames;
   c) process the trajectories of the tracked people to extract one or more trajectory interaction features (TIFs) associated with the trajectories of the two or more people tracked within the first common temporal sequence of video frames; and
   d) apply predefined heuristics to the extracted TIFs to detect an interaction event has occurred between at least two people of the two or more people tracked within the first common temporal sequence of video frames,
   wherein the TIFs include one or more of a position, a velocity and a relative distance associated with the two or more people within the first common temporal sequence of video frames, and the predefined heuristics applied in step d) include the calculation of an evidence vector state, the evidence vector state calculated as a function of a velocity threshold and a proximity threshold associated with the two or more people tracked within the first common temporal sequence of video frames.

10. The video system for automatically detecting the occurrence of an interaction event according to claim 9, wherein steps b)-d) are repeated for a second common temporal sequence of video frames, distinct from the first common temporal sequence of video frames, to determine if the interaction event has occurred between at least two people of the two or more people tracked within the second common temporal sequence of video frames.

11. The video system for automatically detecting the occurrence of an interaction event according to claim 10, further comprising the video processing system configured to:
   e) collect evidence of the detected interaction events in step d), the evidence including one or more of the number of occurrences of the detected interaction event, the number of occurrences of the detected interaction event associated with each of the two or more people detected within the first and second common temporal sequence of video frames, a time duration and start/end time associated with each detected interaction event, a calculated probability of the occurrence of the interaction event, and an indication of static or dynamic movement associated with each of the two or more people detected within the first and second common temporal sequence of video frames.

12. The video system for automatically detecting the occurrence of an interaction event according to claim 11, further comprising the video processing system configured to:
   f) communicate an alert to an operatively associated central system, the alert indicating one or more of the number of occurrences of the detected interaction event, the number of occurrences of the detected interaction event associated with each of the two or more people detected within the first and second common temporal sequence of video frames, a time duration and start/end time associated with each detected interaction event, a calculated probability of the occurrence of the interaction event, and an indication of static or dynamic movement associated with each of the two or more people detected within the first and second common temporal sequence of video frames.

13. The video system for automatically detecting the occurrence of an interaction event according to claim 9, wherein the interaction event is an illegal drug deal between two or more people.

14. The video system for automatically detecting the occurrence of an interaction event according to claim 13, wherein steps b)-d) are repeated for a second common temporal sequence of video frames, distinct from the first common temporal sequence of video frames, to determine if the interaction event has occurred between at least two people of the two or more people tracked within the second common temporal sequence of video frames.

15. The video system for automatically detecting the occurrence of an interaction event according to claim 14, further comprising the video processing system configured to:
   e) collect evidence of the detected interaction events in step d), the evidence including one or more of the number of occurrences of the detected interaction event, the number of occurrences of the detected interaction event associated with each of the two or more people detected within the first and second common temporal sequence of video frames, a time duration and start/end time associated with each detected interaction event, a calculated probability of the occurrence of the interaction event, and an indication of static or dynamic movement associated with each of the two or more people detected within the first and second common temporal sequence of video frames.

16. The video system for automatically detecting the occurrence of an interaction event according to claim 15, further comprising the video system configured to:
   f) communicate an alert to an operatively associated central system, the alert indicating one or more of the number of occurrences of the detected interaction event, the number of occurrences of the detected interaction event associated with each of the two or more people detected within the first and second common temporal sequence of video frames, a time duration and start/end time associated with each detected interaction event, a calculated probability of the occurrence of the interaction event, and an indication of static or dynamic movement associated with each of the two or more people detected within the first and second common temporal sequence of video frames.

17. A video system for automatically detecting an occurrence of an interaction event of two or more objects concurrently present in a surveilled area, the interaction event associated with an illegal drug deal between the two or more objects, comprising:
- a video camera with an associated FOV (field-of-view) directed towards the surveilled area; and
- a video processing system operatively connected to the video camera, the video processing system configured to:
- a) acquire a video stream from the video camera, the video stream including a temporal sequence of video frames including all or part of the surveilled area within all or part of the FOV associated with the video camera;
- b) detect and track two or more objects within a first common temporal sequence of video frames included in the video stream, and generate a trajectory of each object tracked within the first common temporal sequence of video frames;
- c) process the trajectories of the tracked objects to extract one or more trajectory interaction features (TIFs) associated with the trajectories of the two or more objects tracked within the first common temporal sequence of video frames, the TIFs including one or more of a position, a velocity and a relative distance associated with the two or more objects within the first common temporal sequence of video frames; and
- d) apply predefined heuristics to the extracted TIFs to detect an interaction event has occurred between at least two objects of the two or more objects tracked within the first common temporal sequence of video frames, the predefined heuristics including a velocity threshold and a proximity threshold associated with the two or more objects tracked within the first common temporal sequence of video frames, and calculate an evidence vector state, the evidence vector state calculated as a function of the velocity they show and the proximity threshold associated with the two or more objects tracked within the first common temporal sequence of video frames,
- wherein steps b)-d) are repeated for a second common temporal sequence of video frames, distinct from the first common temporal sequence of video frames, to determine if the interaction event has occurred between at least two objects of the two or more objects tracked within the second common temporal sequence of video frames.

18. The video system for automatically detecting the occurrence of an interaction event according to claim 17, further comprising the video system configured to:
- e) collect evidence of the detected events in step d), the evidence including one or more of the number of the number of occurrences of the detected interaction event, the number of occurrences of the detected interaction event associated with each of the two or more objects detected within the first and second common temporal sequence of video frames, a time duration and start/end time associated with each detected interaction event, a calculated probability of the occurrence of the interaction event, and an indication of static or dynamic movement associated with each of the two or more objects detected within the first and second common temporal sequence of video frames.

19. The video system for automatically detecting the occurrence of an interaction event according to claim 18, further comprising:
- a central processing system operatively associated with the video processing system,
- the video processing system is configured to:
- f) communicate an alert to the central processing system, the alert indicating one or more of the number of occurrences of the detected interaction event, the number of occurrences of the detected interaction event associated with each of the two or more objects detected within the first and second temporal sequence of video frames, a time duration and start/end time associated with each detected interaction event, a calculated probability of the occurrence of the interaction event, and an indication of static or dynamic movement associated with each of the two or more objects detected within the first and second common temporal sequence of video frames.

\* \* \* \* \*